US012778021B2

(12) United States Patent
Pikesh et al.

(10) Patent No.: US 12,778,021 B2
(45) Date of Patent: Nov. 3, 2026

(54) COMMODITY CART WITH IMPROVED LOADING POSITIONING

(71) Applicant: Deere & Company, Moline, IL (US)

(72) Inventors: Derryn W. Pikesh, Geneseo, IL (US); Andrew W. Harmon, Geneseo, IL (US)

(73) Assignee: Deere & Company, Moline, IL (US)

( * ) Notice: Subject to any disclaimer, the term of this patent is extended or adjusted under 35 U.S.C. 154(b) by 178 days.

(21) Appl. No.: 18/599,452

(22) Filed: Mar. 8, 2024

(65) Prior Publication Data

US 2024/0306550 A1 Sep. 19, 2024

Related U.S. Application Data

(63) Continuation of application No. 16/878,021, filed on May 19, 2020, now Pat. No. 11,950,538.

(51) Int. Cl.

| | |
|---|---|
| ***A01D 90/02*** | (2006.01) |
| ***B60Q 5/00*** | (2006.01) |
| ***B60R 11/04*** | (2006.01) |
| ***B62D 49/06*** | (2006.01) |
| ***B65G 69/00*** | (2006.01) |
| ***B65G 69/04*** | (2006.01) |

(52) U.S. Cl.

CPC .............. *A01D 90/02* (2013.01); *B60R 11/04* (2013.01); *B62D 49/0614* (2013.01); *B65G 69/00* (2013.01); *B65G 69/0441* (2013.01); *B60Q 5/00* (2013.01); *B60Q 2400/50* (2013.01)

(58) Field of Classification Search

None

See application file for complete search history.

(56) References Cited

U.S. PATENT DOCUMENTS

| | | | | |
|---|---|---|---|---|
| 94,355 A | | 8/1869 | Sims | |
| 4,586,459 A | * | 5/1986 | Schultz .................... | A01C 1/08 118/303 |
| 4,752,134 A | | 6/1988 | Milek | |
| 4,839,835 A | | 6/1989 | Hagenbuch | |
| 5,036,859 A | | 8/1991 | Brown | |
| 5,904,365 A | * | 5/1999 | Dillon .................. | B62D 13/005 280/426 |

(Continued)

FOREIGN PATENT DOCUMENTS

| | | | | |
|---|---|---|---|---|
| AU | 2013272263 A1 | * | 8/2014 | ............. G06F 18/22 |
| CN | 106477353 A | | 3/2017 | |

(Continued)

OTHER PUBLICATIONS

Extended European Search Report and Written Opinion for European Application No. 21171790.5, dated Oct. 19, 2024, 7 pages.

*Primary Examiner* — Fekadeselassie Girma

(74) *Attorney, Agent, or Firm* — Christopher J. Volkmann; Kelly, Holt & Christenson PLLC

(57) ABSTRACT

A commodity cart includes at least one storage tank and a transfer arm having a product chute, a tube portion coupled to the product chute. The tube portion ends in a product outlet. A hydraulic system is coupled to the transfer arm and configured to move the transfer arm to a product loading position wherein the product chute is positioned at a location on the ground. A controller is configured to determine a desired fill vehicle position and generate an indication of the desired fill vehicle position.

20 Claims, 13 Drawing Sheets

(56) References Cited

U.S. PATENT DOCUMENTS

| | | | | | |
|---|---|---|---|---|---|
| 6,148,748 | A * | 11/2000 | Bardi | A01C 7/081 | 111/905 |
| 6,167,337 | A * | 12/2000 | Haack | E02F 9/26 | 701/1 |
| 8,960,412 | B1 | 2/2015 | Maxwell | | |
| 9,233,482 | B2 | 1/2016 | Wallgren | | |
| 9,743,575 | B2 | 8/2017 | Borkgren et al. | | |
| 10,538,195 | B2 * | 1/2020 | Fritz | B60Q 1/143 | |
| 10,647,240 | B1 * | 5/2020 | Grieshop | B60P 1/42 | |
| 10,829,033 | B1 | 11/2020 | McKinney et al. | | |
| 10,834,798 | B1 | 11/2020 | Hunt et al. | | |
| 11,315,258 | B1 * | 4/2022 | Anagnostopoulos | A01B 69/001 | |
| 11,718,225 | B2 * | 8/2023 | Demski | A01B 69/008 | 340/468 |
| 11,950,538 | B2 | 4/2024 | Pikesh et al. | | |
| 2004/0141877 | A1 | 7/2004 | Devine et al. | | |
| 2009/0325658 | A1 | 12/2009 | Phelan et al. | | |
| 2010/0042248 | A1 * | 2/2010 | Mylet | B65G 67/04 | 700/214 |
| 2010/0076612 | A1 | 3/2010 | Robertson | | |
| 2010/0274439 | A1 * | 10/2010 | Reeves | E02F 9/26 | 701/50 |
| 2011/0075441 | A1 | 3/2011 | Swessel et al. | | |
| 2013/0233580 | A1 * | 9/2013 | Kinzenbaw | A01B 73/065 | 172/1 |
| 2015/0022664 | A1 | 1/2015 | Pflug et al. | | |
| 2015/0105965 | A1 * | 4/2015 | Blackwell | A01B 59/002 | 701/28 |
| 2015/0225188 | A1 * | 8/2015 | Belluk | B65G 67/02 | 340/12.5 |
| 2015/0264866 | A1 * | 9/2015 | Foster | A01B 69/004 | 414/21 |
| 2016/0242358 | A1 | 8/2016 | Mossman | | |
| 2017/0260008 | A1 | 9/2017 | DeWitt et al. | | |
| 2018/0251324 | A1 | 9/2018 | Sucre | | |
| 2019/0059217 | A1 | 2/2019 | Matousek et al. | | |
| 2020/0024087 | A1 | 1/2020 | Fehr et al. | | |
| 2020/0180493 | A1 | 6/2020 | Thompson | | |
| 2020/0324688 | A1 | 10/2020 | Anderson et al. | | |
| 2021/0034867 | A1 | 2/2021 | Ferrari et al. | | |
| 2021/0043085 | A1 | 2/2021 | Kreiling et al. | | |
| 2021/0155424 | A1 | 5/2021 | Hoffmann et al. | | |
| 2021/0333802 | A1 * | 10/2021 | Singh | A01D 41/1278 | |
| 2021/0339729 | A1 | 11/2021 | O'Connor et al. | | |
| 2021/0352837 | A1 | 11/2021 | DeWaard | | |
| 2022/0007586 | A1 | 1/2022 | Stukenholtz et al. | | |
| 2024/0306550 | A1 * | 9/2024 | Pikesh | A01D 90/02 | |

FOREIGN PATENT DOCUMENTS

| | | | | | |
|---|---|---|---|---|---|
| CN | 109715894 | A * | 5/2019 | E04G 21/22 | |
| DE | 102018005446 | A1 | 4/2020 | | |
| EP | 2161589 | A1 * | 3/2010 | G01S 5/08 | |
| EP | 3279760 | A1 | 2/2018 | | |
| EP | 3406123 | A1 | 11/2018 | | |
| EP | 3649844 | A1 | 5/2020 | | |
| JP | H0429012 | U | 3/1992 | | |
| JP | 2594442 82 | | 3/1997 | | |
| JP | 2019028688 | A * | 2/2019 | A01D 41/1278 | |
| WO | WO-2016074058 | A1 * | 5/2016 | G06Q 50/02 | |
| WO | 2019165150 | A1 | 8/2019 | | |
| WO | WO-2020081909 | A1 * | 4/2020 | G06F 17/16 | |

* cited by examiner

COMMODITY CART WITH IMPROVED LOADING POSITIONING

CROSS-REFERENCE TO RELATED APPLICATION

The present application is a continuation of and claims priority of U.S. patent application Ser. No. 16/878,021, filed May 19, 2020, the content of which is hereby incorporated by reference in its entirety.

FIELD OF THE DESCRIPTION

The present description relates to positioning a vehicle relative to an agricultural commodity cart. More specifically, the present description relates to automatic positioning guidance for a vehicle being positioned relative to an agricultural commodity cart.

BACKGROUND

Agricultural operations such as planting, harvesting, and applying agricultural product (e.g., fertilizer, pesticide, herbicide, etc.) are typically subject to time constraints. Moreover, even in the absence of pressing time deadlines, efficient agricultural operations should be done relatively quickly.

One time-consuming agricultural operation is the loading/unloading of agricultural material to/from an agricultural commodity cart. Efforts have been made to move significant quantities of material to/from the commodity cart quickly. However, there remain opportunities for reducing the time spent interacting with a commodity cart. To the extent that time spent on commodity cart interaction can be reduced, overall agricultural efficiency can be increased.

SUMMARY

A commodity cart includes at least one storage tank and a transfer arm having a product chute, a tube portion coupled to the product chute. The tube portion ends in a product outlet. A hydraulic system is coupled to the transfer arm and configured to move the transfer arm to a product loading position wherein the product chute is positioned at a location on the ground. A controller is configured to determine a desired fill vehicle position and generate an indication of the desired fill vehicle position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein generally provide an indication to a driver or controller of a filling vehicle (e.g., side dump or end dump truck) that provides the driver or controller with a target location and/or orientation for positioning the filling vehicle relative to a commodity cart in order to facilitate quick and efficient commodity transfer operations.

Figure 1:
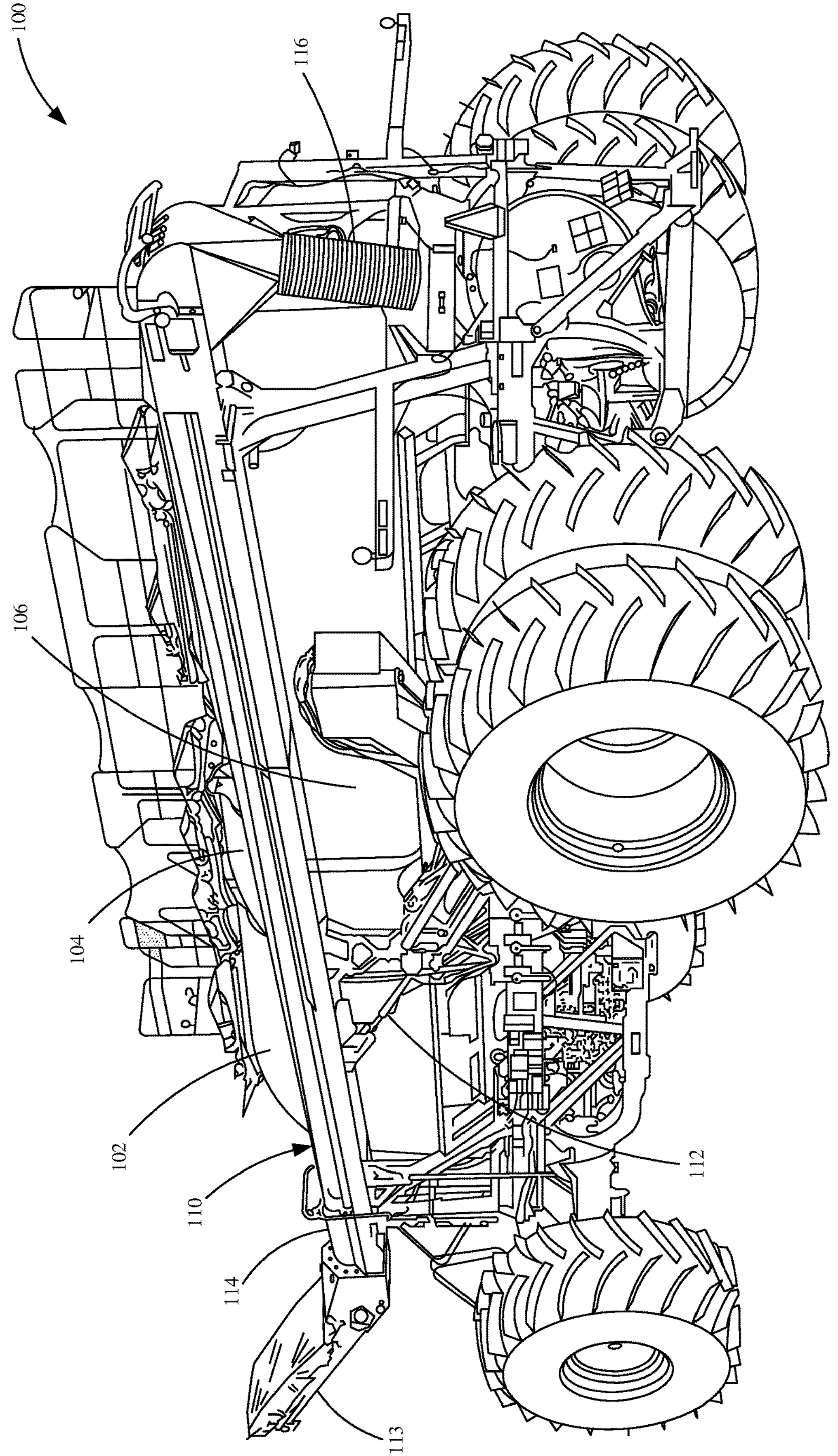
FIG. 1 is a diagrammatic view of a commodity cart with which embodiments described herein are particularly applicable.

FIG. 1 is a diagrammatic view of one particular commodity cart with which embodiments described herein are particularly applicable. However, while embodiments will be described with respect to commodity cart 100, it is expressly contemplated that any suitable commodity storage vehicle or system can be used in accordance with the various embodiments. Accordingly, embodiments are practicable with commodity carts that are towed behind a tractor or agricultural system, as well as with self-powered agricultural carts and even agricultural carts that operate autonomously.

As shown in FIG. 1, commodity cart 100 includes one or more commodity storage tanks 102, 104, 106 that are configured to store a granular material, such as seed or fertilizer. Each tank generally includes a loading hatch on a top portion thereof that, when opened, can receive the granular material. Commodity cart 100 also includes transfer arm 110 that can be moved in various directions under the control of a hydraulic system 112 mounted to the frame of commodity cart 100. Transfer arm 110 has a product chute 113 that is configured to be positioned on or near the ground and may include a conveyor belt or other suitable product movement system. Within tube 22 portion 114 of transfer arm 110, an auger or other suitable mechanism is configured to move product received by product chute 113 up to output 116, which is generally configured by hydraulic system 112 to be positioned above one of the input ports of tanks 102, 104, or 106.

Figure 2:
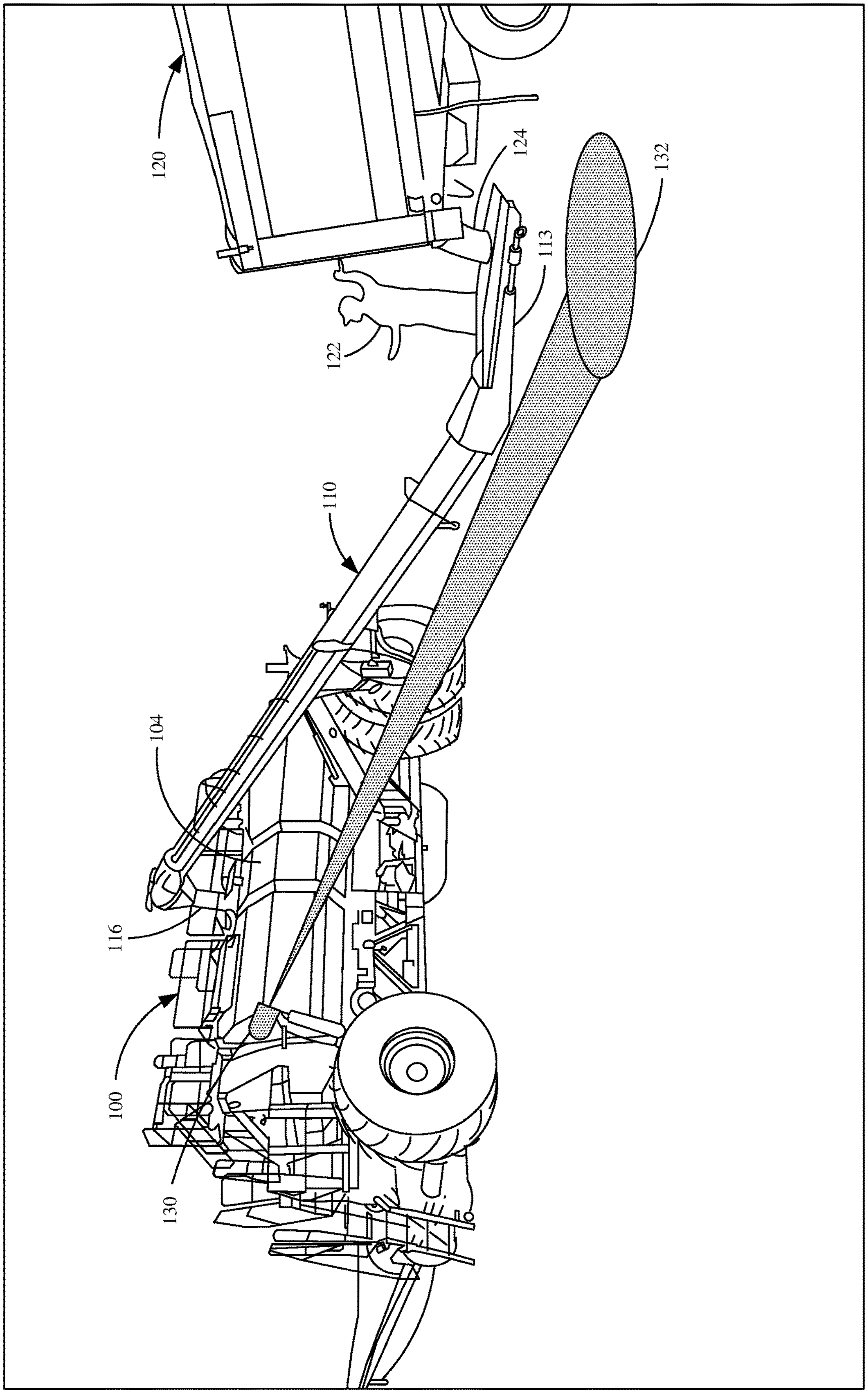
FIG. 2 is a diagrammatic view of a commodity cart being filled by a filling vehicle.

FIG. 2 is a diagrammatic view of commodity cart 100 being filled by a filling vehicle 120 (illustrated diagrammatically as an end dump truck). As can be seen, an operator 122 is interacting with a dump portion of filling vehicle 120 such that granular agricultural product 124 falls into product chute 113 of transfer arm 110. The output 116 of transfer arm 110 is positioned by hydraulic system 112 to be above tank 104.

In accordance with an embodiment described herein, cart 100 is provided with a system that is able to provide an indication to driver/operator 122 for positioning filling vehicle 120 with respect to commodity cart 100. In FIG. 2, a portion of this system is illustrated diagrammatically at reference numeral 130 projecting an indication 132 (illustrated diagrammatically as a spot) on the ground. Operator 122 need only position filling vehicle 120 such that the end of the open-bed box is positioned such that granular agricultural product 124 will 6 fall into or onto the projected indication 132. This ensures that hydraulic system 112 can position 7 product chute 113 proximate the projected indication 132.

As can be appreciated, the indication provided to the operator of the filling vehicle can be done in any number of ways. The spotlight shown in FIG. 2 is merely one example.

Figure 3:
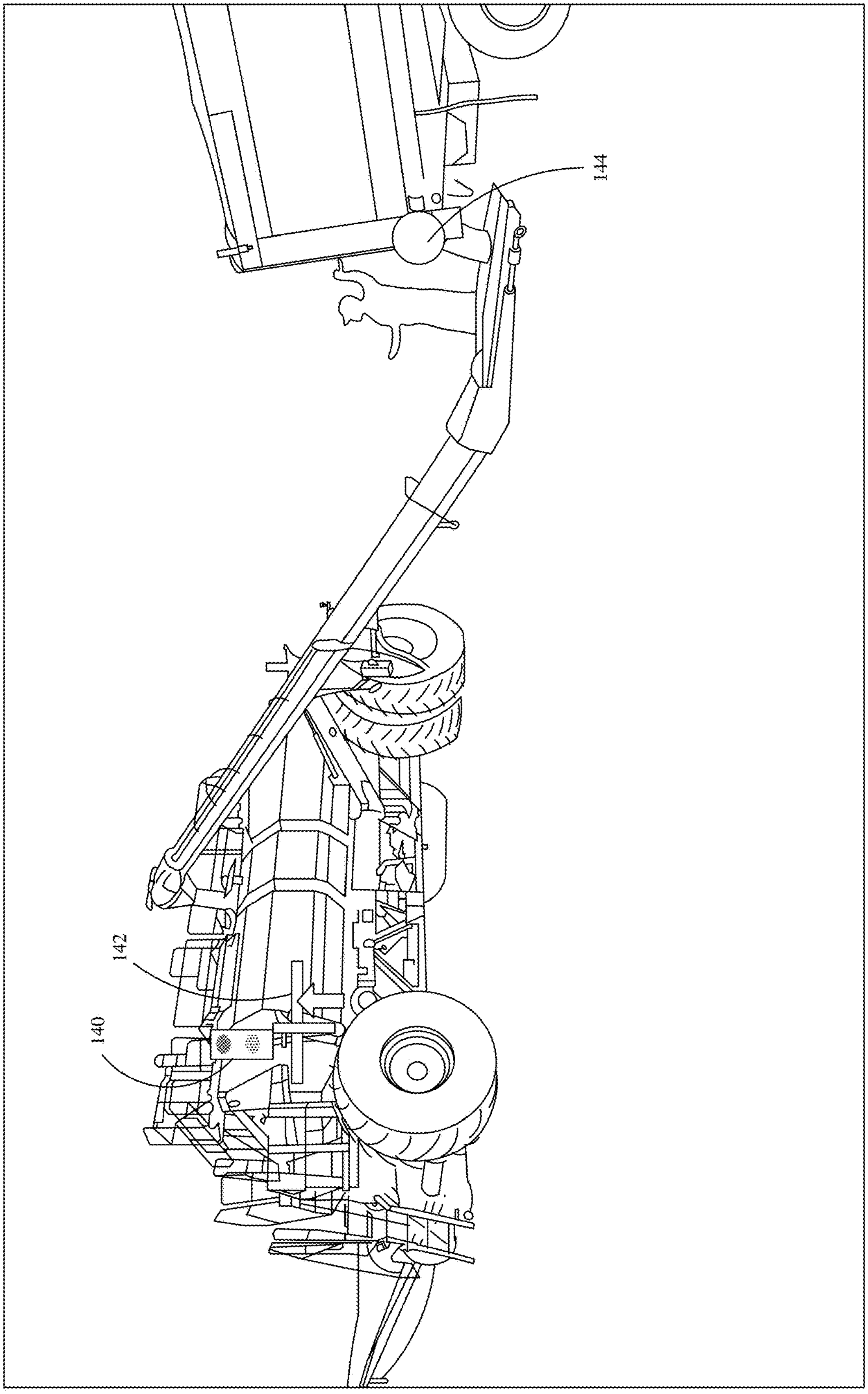
FIG. 3 is a diagrammatic view of a position indication being provided on a commodity cart in accordance with one embodiment.

FIG. 3 is a diagrammatic view of a position indication being provided on a commodity cart in accordance with one embodiment. FIG. 3 illustrates an embodiment where visual indications are provided on the commodity cart itself. As shown, the visual indication May include a stoplight 140 as well as directional indicator 142. Stoplight indicator 140 may provide a green light indicating that driver/operator 122 should continue to back the filling vehicle 120 toward commodity cart 100 and directional indicator 142 can provide an indication of whether filling vehicle 120 should be moved to the left or to the right. Accordingly, once directional indicator 142 illustrates a centered condition and stoplight 140 turns red, filling vehicle 120 will be in the commodity cart's desired filling position. Additionally, as shown in FIG. 3, each filling vehicle 120 may be provided with a target or optical tag 144 that can be identified by an optical system on commodity cart 100 in order to automatically determine a precise position of filling vehicle 120 or even a precise position of a location of a product unloading portion of the filling vehicle. Target or artifact 144 maybe designed to have a suitable shape/color or retro-reflective aspect such that it can be easily identified by the visual system of commodity cart 100.

Figure 4:
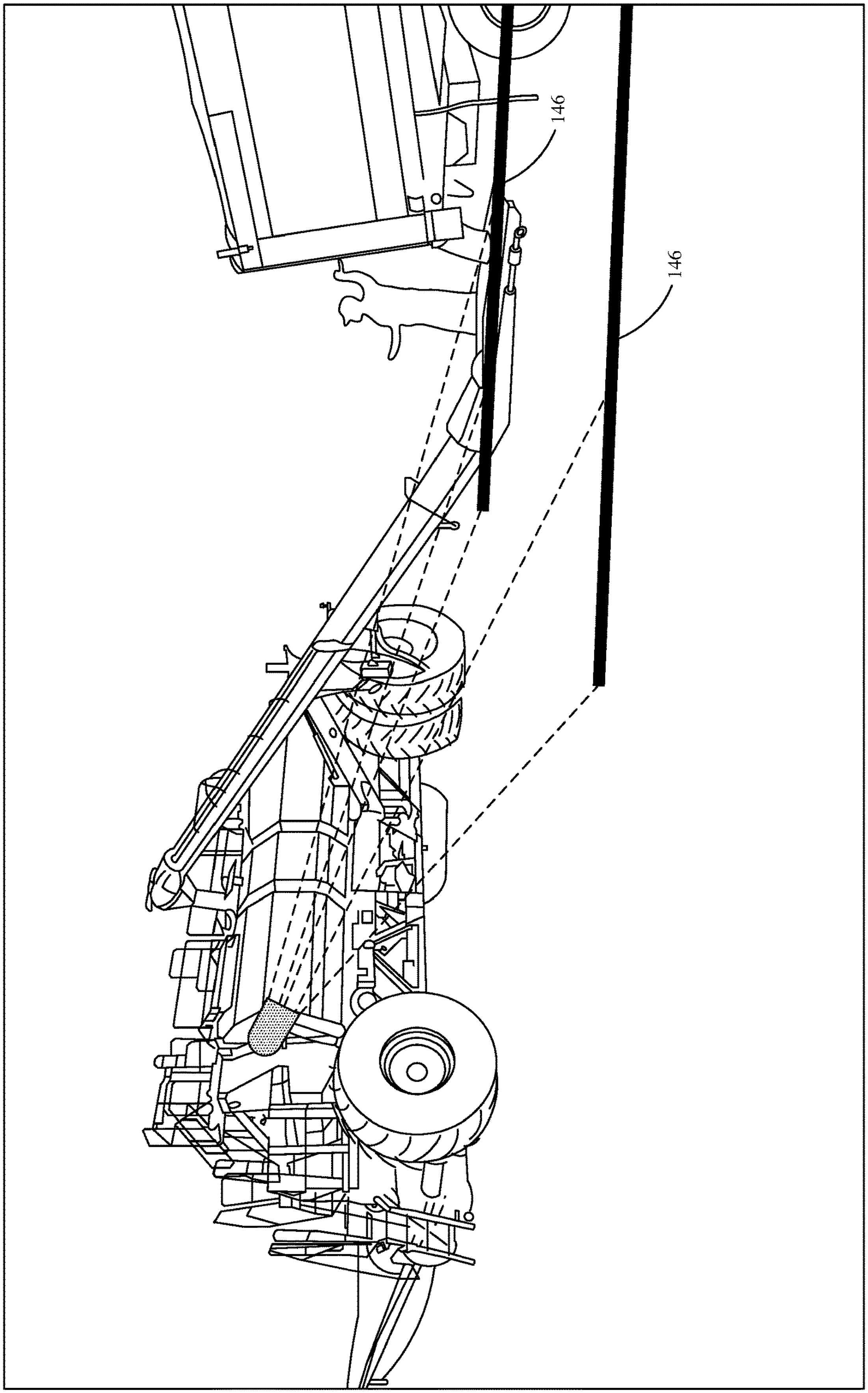
FIG. 4 is a diagrammatic view of a commodity cart where position indications in the form of a pair of substantially parallel lines are projected by the commodity cart in accordance with one embodiment.

FIG. 4 is a diagrammatic view of a commodity cart where the indications to the driver that are projected by the commodity cart include a pair of substantially parallel lines 146. These lines 146 may be projected in any suitable manner including the utilization of lasers. By providing a pair of lines 146, operator 122 can essentially back filling vehicle 120 into the lane created by the parallel lines 146 ensuring both the position and orientation of the filling vehicle with respect to the commodity cart. Further, any suitable indication can be provided by commodity cart 100 with respect to when driver/operator 122 should stop backing filling vehicle 120 toward commodity cart 100 including the provision of a spotlight 132 (such as shown in FIG. 3), a toplight, such as stoplight 140 (shown in FIG. 3) or even an audible indicator such as a horn blast.

Figure 5:
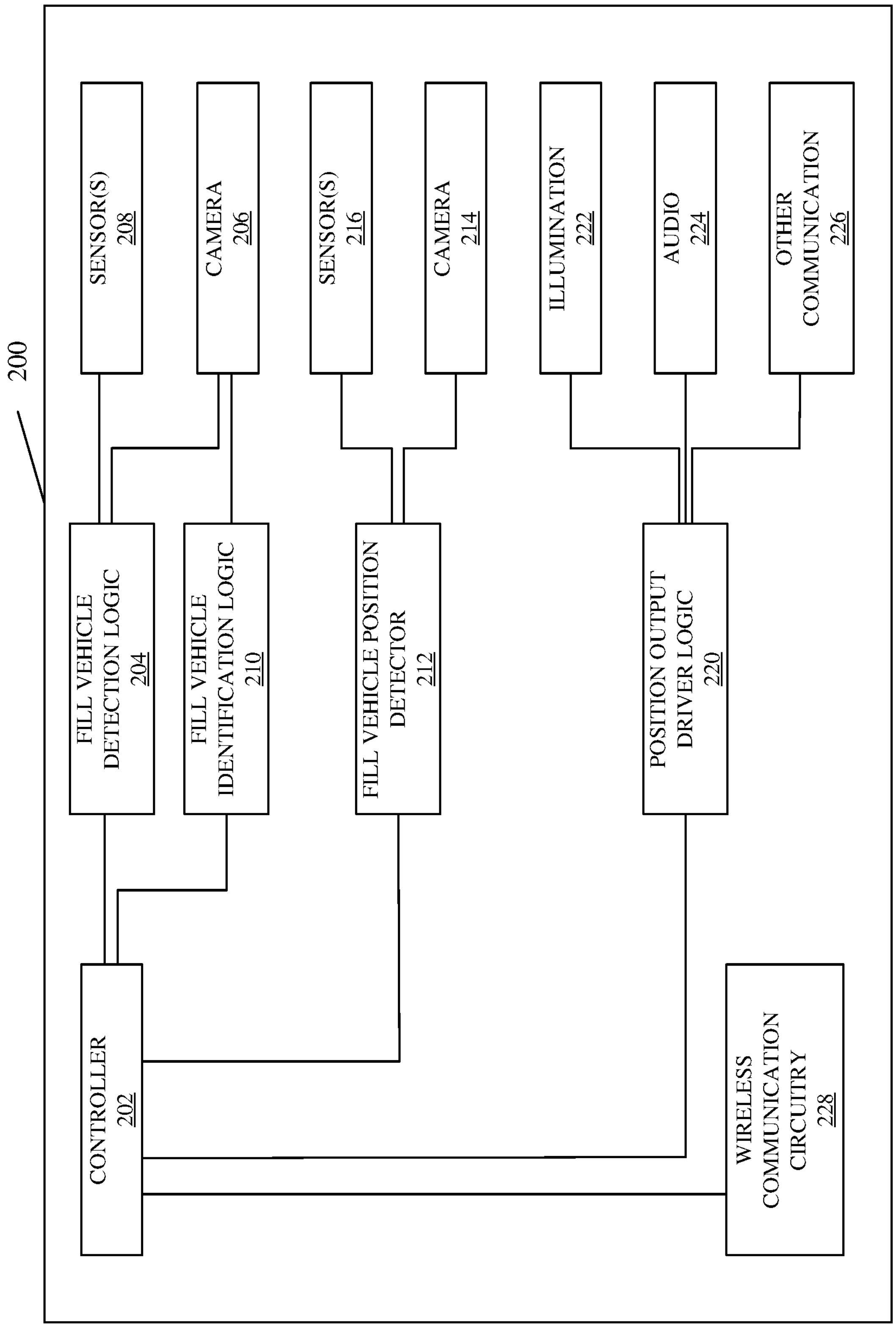
FIG. 5 is a block diagram of a control system of a commodity cart in accordance with one embodiment.

FIG. 5 is a block diagram of a control system of a commodity cart in accordance with an embodiment described herein. Control system 200 includes controller 202 that includes a processor, memory, and associated timing components in order to programmatically execute instructions stored in memory. In one embodiment, controller 202 is a microprocessor. Controller 202 is coupled to fill vehicle detection logic 204 that is configured to detect proximity of a fill vehicle in order to initiate the automatic fill vehicle positioning techniques described herein. Detection of fill vehicle proximity can be done in a variety of ways. In one example, fill vehicle detection logic is coupled to camera 206 and employs machine vision to identify an approaching vehicle. Additionally, or alternatively, one or more sensors 208 may also be coupled to fill vehicle detection logic 204 in order to facilitate fill vehicle detection. Examples of suitable sensors include ultrasonic distance sensors, laser-based range finding sensors, LIDAR, etc. Additionally, in embodiments where an aspect of the fill vehicle is enrolled or otherwise engaged in an electronic data network of which the commodity cart participates (e.g., an app executing on a smartphone of driver/operator 122 driving the fill vehicle) proximity may be detected based on querying the position of the fill vehicle relative to a known GPS position of the commodity cart.

Controller 202 is also coupled to fill vehicle identification logic 210 which is configured to provide an indication to controller 202 of the type of fill vehicle. For example, fill vehicle identification logic may provide an indication regarding whether the fill vehicle is a side dump truck, or an end dump truck. Further, other types of fill vehicles may also be identified and provided by fill vehicle identification logic 210. In the example illustrated in FIG. 5, fill vehicle identification logic 210 is also coupled to camera 206 and employs known machine vision techniques to optically identify the type of fill vehicle (e.g. end duck truck vs side dump truck). Additionally, it is expressly contemplated, that in embodiments where a portion of the fill vehicle is enrolled or present on the same data network as the commodity cart, the fill vehicle type may simply be queried. For example, an application executing on a smartphone of operator 122 may have a setting indicating that the operator is operating a side dump truck.

Control system 200 may also include a fill vehicle position detector 212 coupled to controller 202. Detecting the position of the fill vehicle is useful for embodiments that provide active feedback to the operator during positioning of the fill vehicle. However, it is also expressly contemplated, that some embodiments can be practiced where a simple indication is provided (such as that shown via spotlight 132 in FIG. 2). When fill vehicle position is detected, such detection can be performed using optical techniques, such as via a camera 214 and/or sensors 216. Additionally, it is noted that camera 214 and sensors 216 could share components or even be the same components. However, they are provided as different reference numerals to clearly indicate that they may be separate components. Via optical recognition of the fill vehicle using camera 214 and/or signals from sensor(s) 216, fill vehicle position detector determines a position of the fill vehicle relative to commodity cart 100 and provides the detected position to controller 202. Controller 202 determines a desired position for the fill vehicle based on the type of the fill vehicle and calculates a difference between the detected fill vehicle position and the desired fill vehicle position. Controller 202 then engages position output driver logic 220 in order to generate suitable 11 indications to the driver/operator 122. Examples of such indications can include optical 12 illumination 222 that may be provided on the ground, or on the fill vehicle itself. Examples of such optical indications are provided in FIGS. 2-4. Additionally, or alternatively, some position indications can be provided via audio indications 224. Examples of audio indications can include a horn blast to indicate that the driver should stop backing the vehicle. Additionally, or alternatively, audio indications may include a synthesized or recorded voice indicating that the operator should back up, turn left, turn right, etc. Additionally, position output indications can be provided via other communication 226 to the operator/driver 122. For example, in embodiments where the commodity cart is on the same data communication network as a portion of the fill vehicle (e.g., an app executing on a smartphone of driver 122, or an app executing within the fill vehicle itself) the position indication may simply be communicated to the driver/application.

FIG. 5 illustrates controller 202 coupled to wireless communication circuitry 228. This wireless communication circuitry can take any suitable form. Wireless communication circuitry 228 can communicate in accordance with one or more known wireless communication techniques in order to allow controller 202 to communicate with remote devices. Examples of such wireless communication include, without limitation, Bluetooth (such as Bluetooth Specification 2.1 rated at Power Class 2); a Wi-Fi specification (such as IEEE 802.11.a/b/g/n); a known RFID specification; cellular communication techniques (such as GSM/CDMA); WiMAX (IEEE 802.16m), and/or satellite communication.

Figure 6:
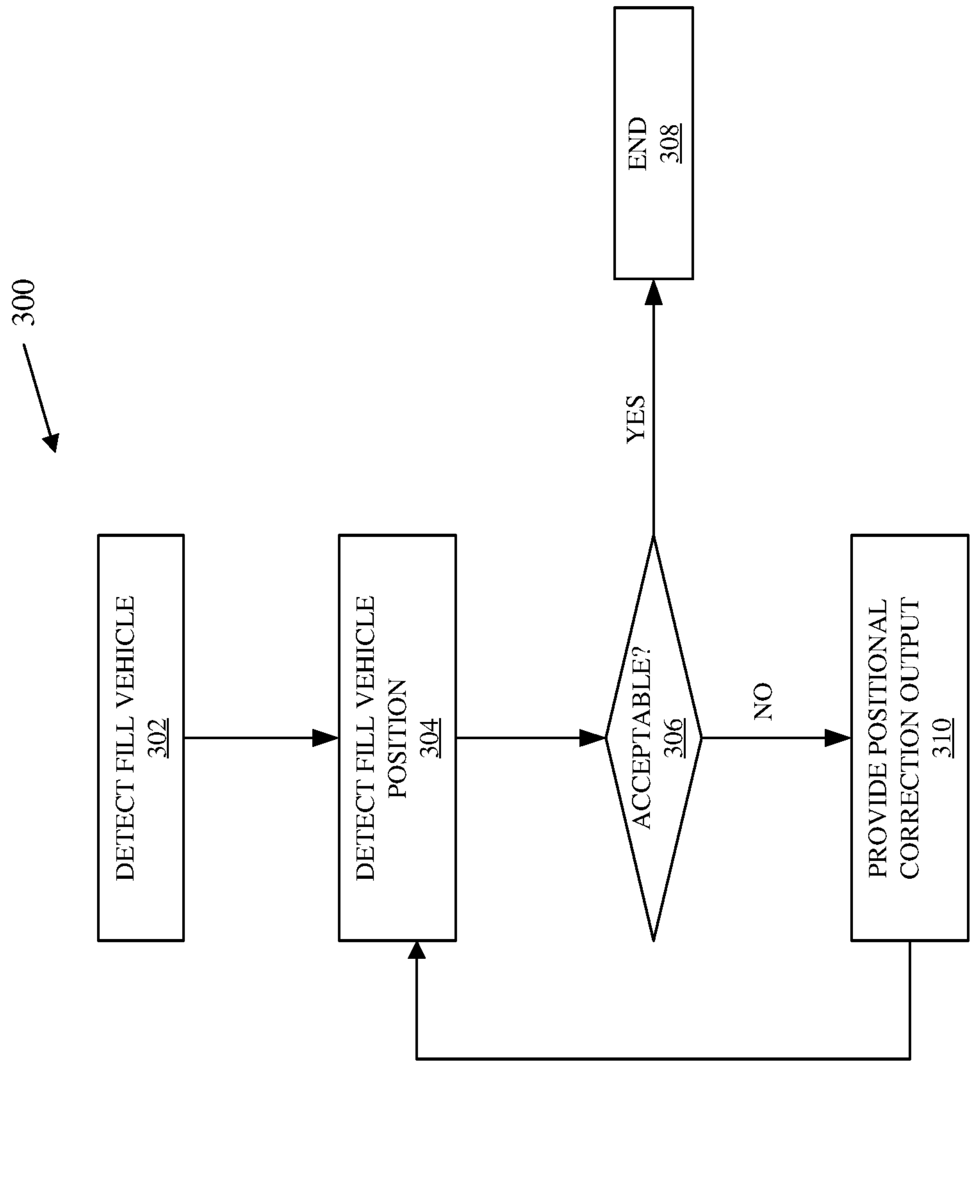
FIG. 6 is a flow diagram of a method of interacting with a commodity cart in accordance with one embodiment.

FIG. 6 is a flow diagram of a method of interacting with a commodity cart in accordance with one embodiment. Method 300 begins at block 302 where the fill vehicle is detected. Next, at block 304, method 300 determines the position of the fill vehicle. This can be done in a variety of ways, as set forth above. At block 306, controller 202 determines whether the detected fill vehicle position is acceptable based on the type of fill vehicle. For example, if the fill vehicle is an end dump truck, an acceptable position may be whether the end of the open-top box 6 of the dump truck is at a desired position. If the position is acceptable, method 300 proceeds to block 308 where the method ends, and fill vehicle interaction, such as positioning of the product movement arm 110 via hydraulic system 112 can occur. If, however, the position of the fill vehicle is not acceptable, then control passes to block 310, where controller 202 calculates a positional correction output and generates the output to the fill vehicle. Examples of such positional correction output can include optical outputs 312, audio outputs 314, or data communication 316 to the fill vehicle, or to an application executing on a smartphone of the driver of the fill vehicle. Next, method 300 repeats by returning to block 304 to detect the position of the fill vehicle. Method 300 iterates until the fill vehicle is acceptably positioned for the commodity cart.

Figure 7:
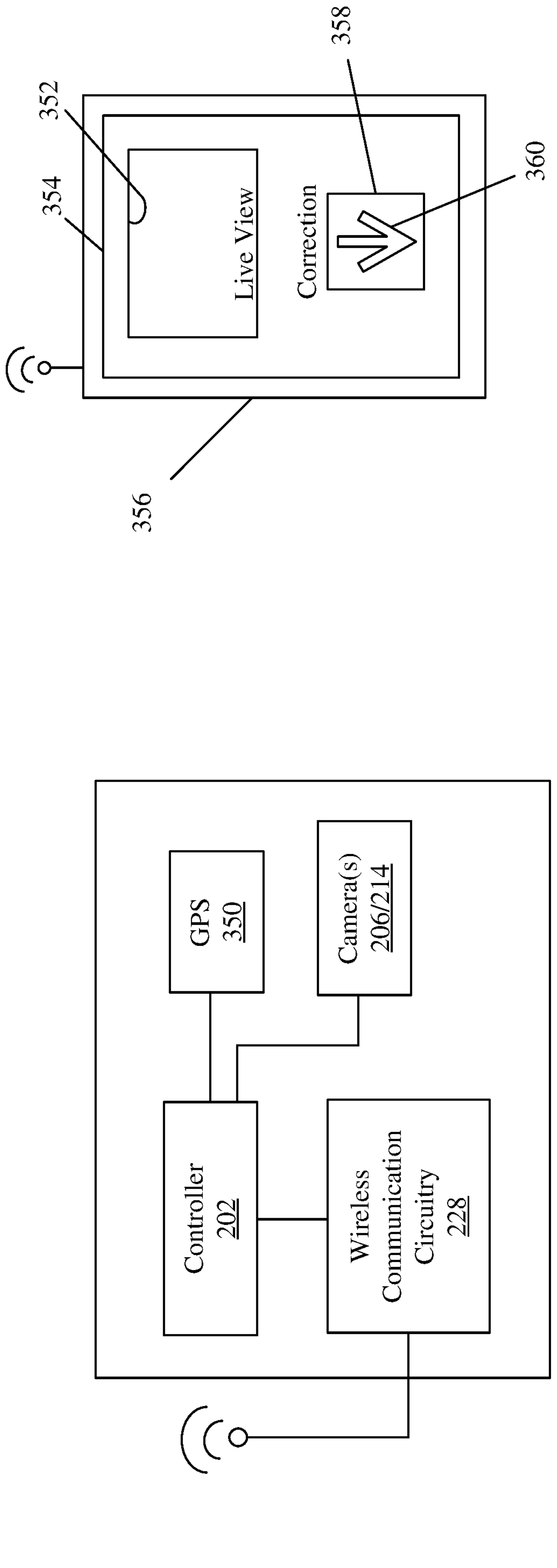
FIG. 7 is a diagrammatic view of a portion of control system of a commodity cart interacting with an application executing on a smartphone or a mobile device of an operator or driver of a fill vehicle in accordance with one embodiment.

FIG. 7 is a diagrammatic view of a portion of control system 200 of a commodity cart interacting with an application executing on a smartphone or a mobile device of an operator or driver of a fill vehicle. In the embodiment shown in FIG. 7, control system 200 is also provided 18 with a GPS module 250 coupled to controller 202 such that commodity cart 100 is able to determine its own geographic position using global positioning satellite signals. As driver/operator 122 moves fill vehicle 120 within a selected threshold (i.e., such as crossing a geofence) relative to commodity cart 100, the automatic alignment techniques and methods described herein May begin to automatically execute. First, crossing the geofence may be a direct indication of fill vehicle detection, as described above. Additionally, the driver of the fill vehicle is generally aware of the type of fill vehicle (e.g., end dump truck, side dump truck, etc.) that he or she is driving. This information can be input by the driver/operator into the app executing on the driver's mobile device and thus interrogated by commodity cart 100 as fill vehicle 120 approaches. Upon reaching a suitable close-in threshold (e.g., such as 100 yards) the commodity cart may begin providing position correction indications to the driver of the fill vehicle. As described above, these may be optical indications, such as a spotlight or lines projected on the ground, or other suitable optical projections. In still other embodiments, controller 202 may provide position control signals relative to the fill vehicle such that a control system of the fill vehicle may turn some aspects of control (e.g., steering, acceleration, and braking) over to the commodity cart for automatic positioning.

In embodiments where automatic positioning is not used, it may also be useful for the driver to have a live view of the area between the commodity cart and the fill vehicle. This live view may be provided within live view portion 352 of application 354 on the mobile device. The image for the live view may be obtained from one or more cameras 206/214 and communicated wirelessly from commodity cart 100 to mobile device 356 via wireless communication module 228. Additionally, positional correction signals may be provided such as indicated in positional correction window 358 which shows an arrow 360 to the operator that indicates that the fill vehicle should proceed straight back.

While the embodiment described with respect to FIG. 7 illustrates mobile device 356, it is also expressly contemplated that aspects of mobile device 356, or the entire mobile device 356 may be embodied entirely within the fill vehicle.

While embodiments described thus far have generally provided a commodity cart with the ability to project or otherwise provide indications to an operator of a fill vehicle to position the fill vehicle relative to the commodity cart, it is also expressly contemplated that the commodity cart may include its own unmanned aerial vehicle that can facilitate such interaction.

Figure 8:
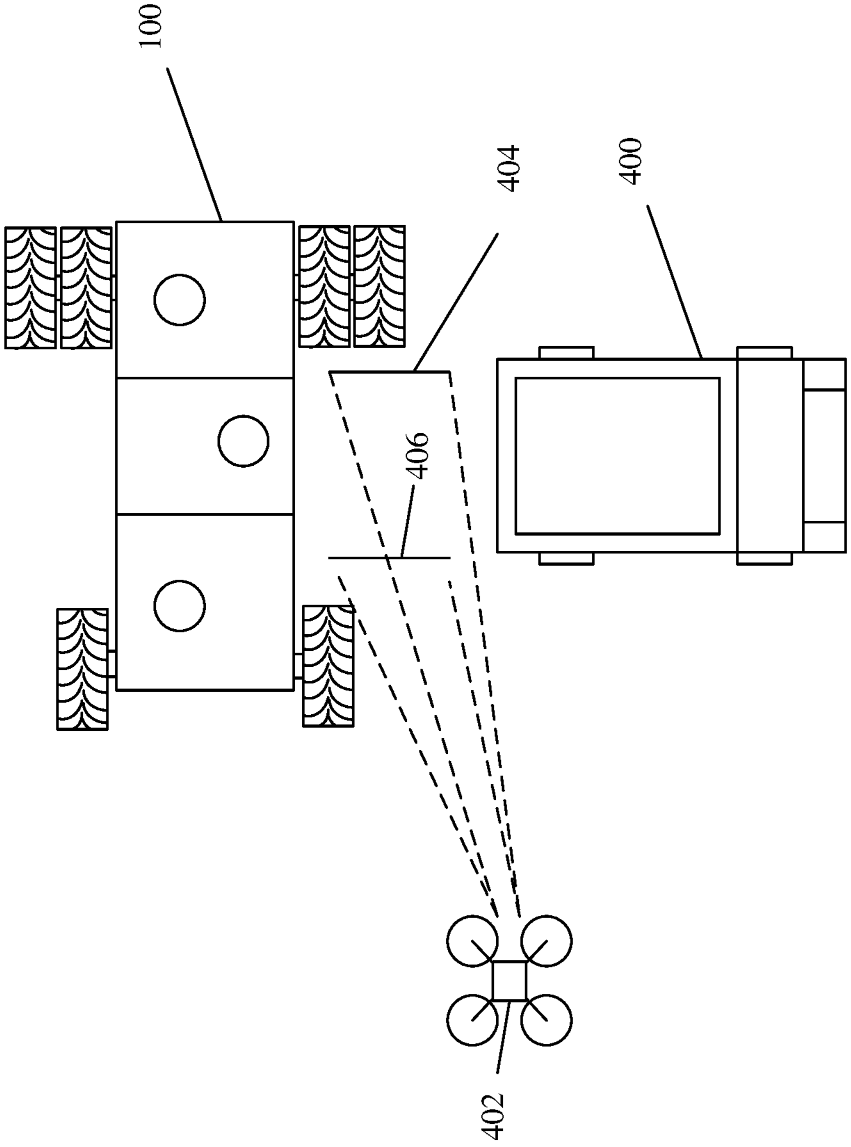
FIG. 8 is a top view of a commodity cart and dump truck being positioned with the assistance of an unmanned aerial vehicle in accordance with one embodiment.

FIG. 8 is a top view, of a commodity cart 100, and dump truck 400 being positioned with the assistance of an unmanned aerial vehicle (i.e., drone 402). Drone 402 may be housed and charged by commodity cart 100. Accordingly, it may be considered a component or system of commodity cart 100. Upon detecting a fill vehicle, either by virtue of geofence proximity or optical detection techniques, commodity cart 100 may cause drone 402 to launch. Drone 402 provides an indication of its own position to controller 202 and thus may be useful in projecting optical indications to the driver/operator of the fill vehicle. In the embodiment shown in FIG. 8, drone 402 is projecting a pair of lines 404, 406. However, it will be appreciated, that drone 402 may project any suitable optical indications. Additionally, drone 402 may include its own camera, the output of which, may be fed directly to live view 352 of the driver/operator's mobile device. In this way, the driver/operator may be provided with a bird's eye view that not only shows real-time position, but may be overlaid with the optical indication itself. In such embodiments, the optical indication may be provided solely in live view 352 and need not be actually projected onto the ground. Further, the live view also allows the operator to see any potential hazards nearby.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
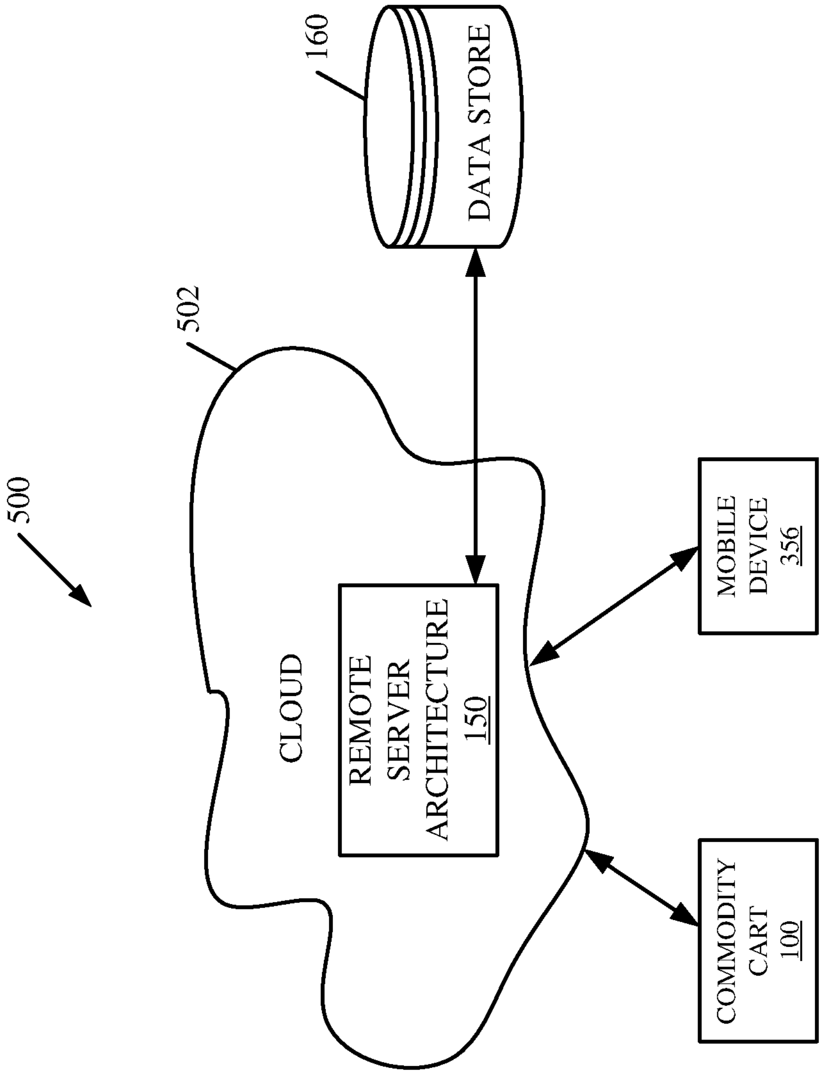
FIG. 9 is a block diagram of a commodity cart that communicates with elements in a remote server architecture in accordance with one embodiment.

FIG. 9 is a block diagram of commodity cart 100, shown in FIG. 1, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

FIG. 9 also depicts an embodiment of a remote server architecture. FIG. 9 shows that it is also contemplated that some elements are disposed at remote server location 502 while others are not. By way of example, data store 160 can be disposed at a location separate from location 502, and accessed through the remote server at location 502. Regardless of where they are located, they can be accessed directly by commodity cart 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck or tractor) can have an automated information collection system. As the commodity cart comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). All of these architectures are contemplated herein.

Figure 10:
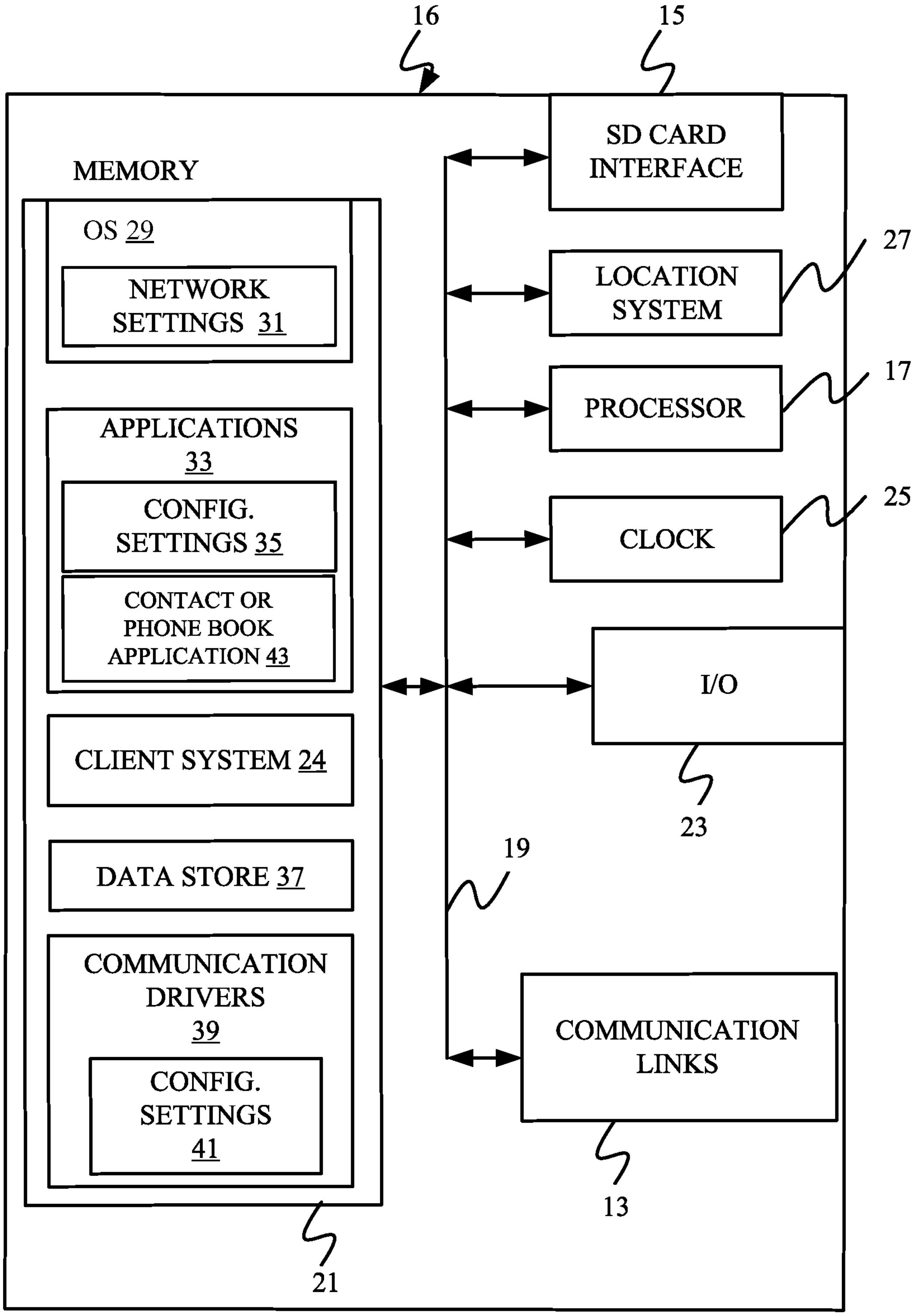
FIG. 10 is a simplified block diagram of one illustrative embodiment of a handheld or mobile computing device that can be used as a driver or operator's handheld device in accordance with one embodiment.
Figure 11:
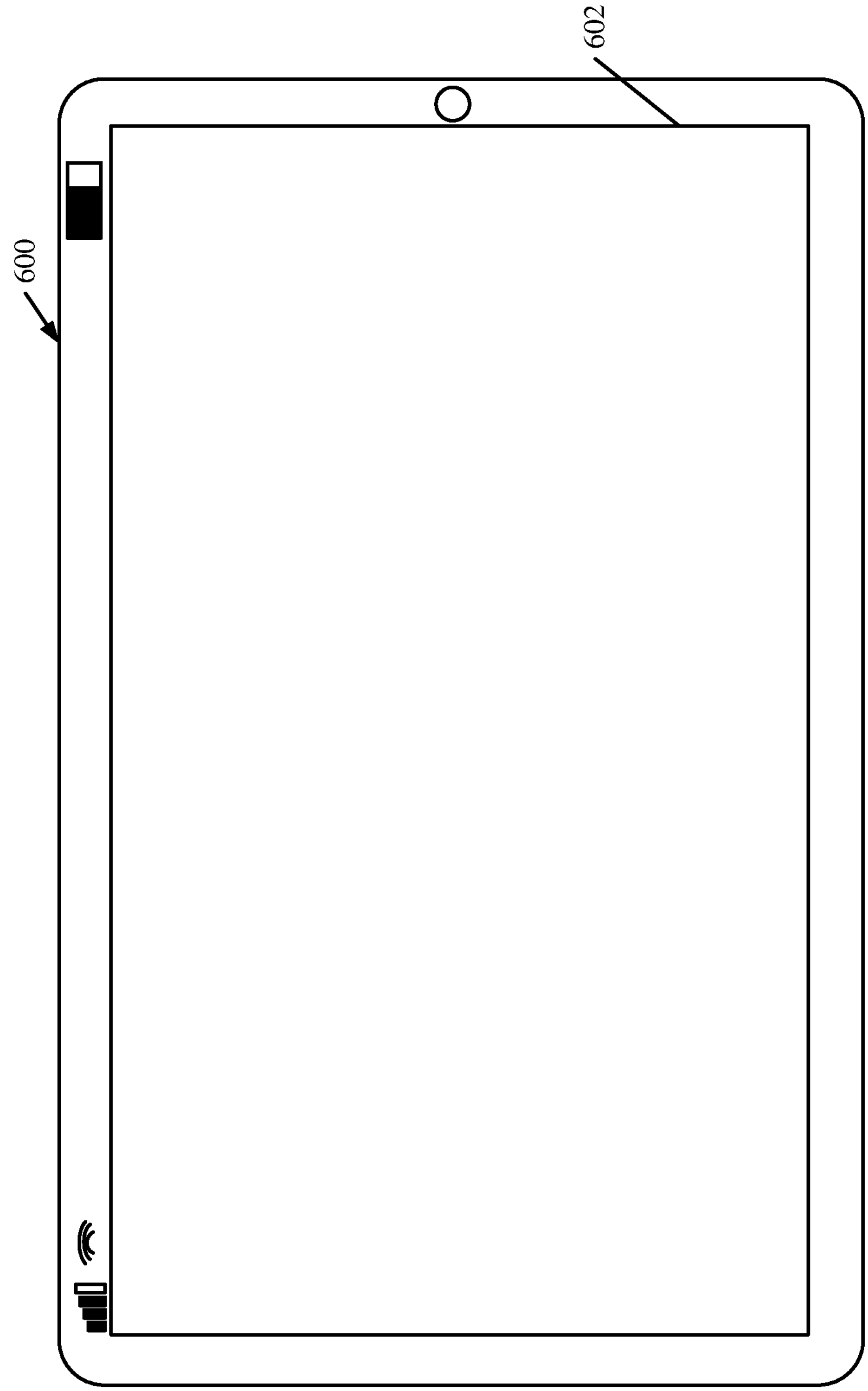
FIGS. 11-12 are examples of handheld or mobile devices.
Figure 12:
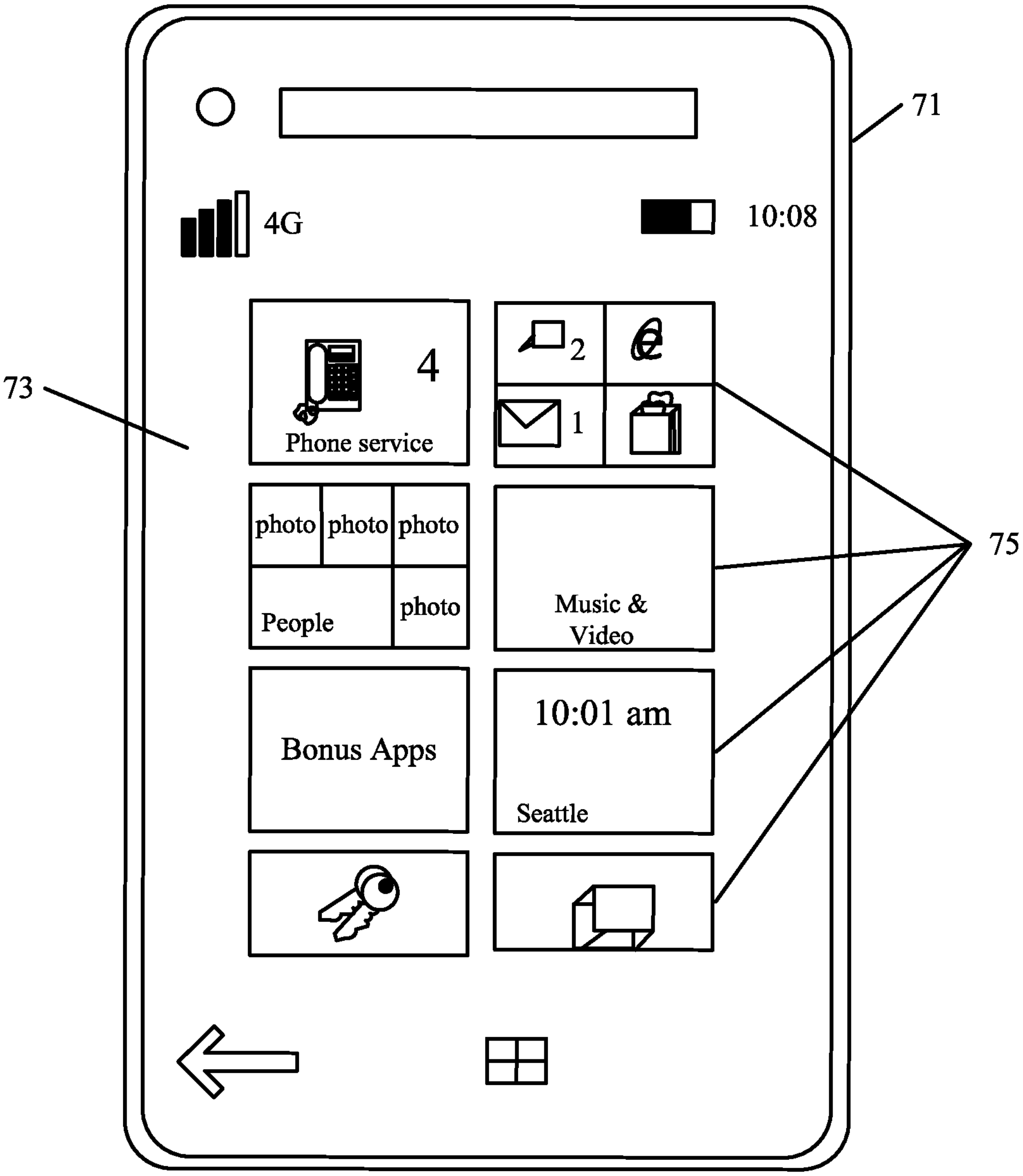

FIG. 10 is a simplified block diagram of one illustrative embodiment of a handheld or mobile computing device that can be used as a driver or operator's handheld device 16, in which the present system (or parts of it) can be deployed. FIGS. 11-12 are examples of handheld or mobile devices.

FIG. 10 provides a general block diagram of the components of a mobile device 16 that can run some components shown in FIG. 7. In device 16, a communications link 13 is provided that allows the mobile device to communicate with other computing devices and under some embodiments provides a channel for receiving information automatically, such as by canning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 11 shows one embodiment in which device 16 is a tablet computer 600. In FIG. 11, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows an embodiment where mobile device 16 is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
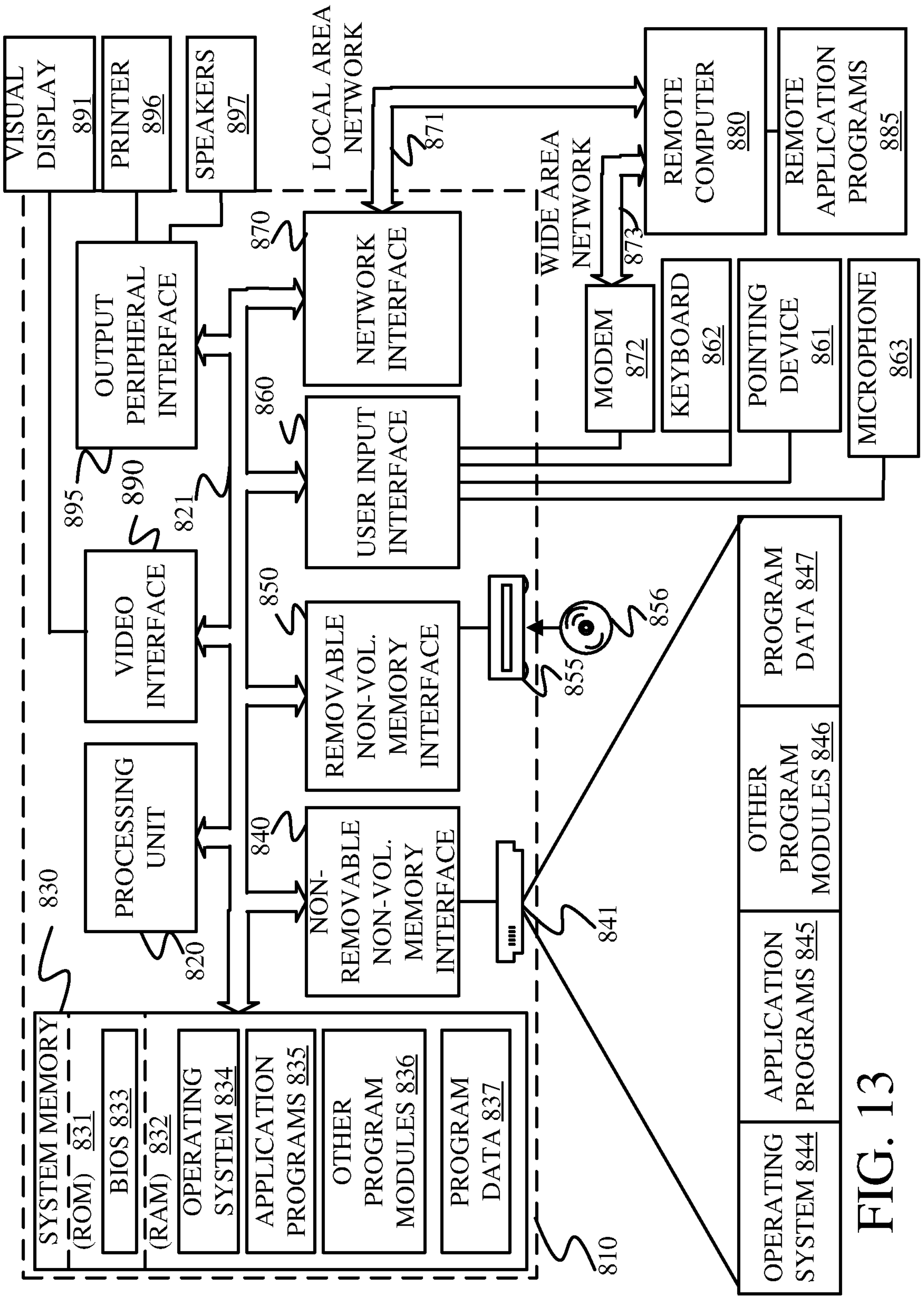
FIG. 13 provides a general block diagram of the components of a device that can run some or all components shown in FIG. 5.

FIG. 13 is one embodiment of a computing environment in which elements of FIGS. 5 and 7, or parts thereof, (for example) can be deployed. With reference to FIG. 13, an exemplary system for implementing some embodiments includes a general-purpose computing device in the form of a computer 810. Components of computer 810 may include, but are not limited to, a processing unit 820 (which can comprise controller 202), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 5 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a commodity cart including at least one storage tank and a transfer arm having a product chute, a tube portion coupled to the product chute, the tube portion ending in a product outlet. A hydraulic system is coupled to the transfer arm and is configured to move the transfer arm to a product loading position wherein the product chute is positioned at a location on the ground. A controller is configured to determine a desired fill vehicle position and to generate an indication of the desired fill vehicle position.

Example 2 is a commodity cart of any or all previous examples wherein the indication includes a visual indication.

Example 3 is a commodity cart of any or all previous examples wherein the visual indication is projected onto the ground by the commodity cart.

Example 4 is a commodity cart of any or all previous examples wherein the visual indication is a spotlight.

Example 5 is a commodity cart of any or all previous examples wherein the visual indication includes a pair of parallel lines.

Example 6 is a commodity cart of any or all previous examples wherein the indication includes a directional indication.

Example 7 is a commodity cart of any or all previous examples wherein the indication includes a stoplight on the commodity cart.

Example 8 is a commodity cart of any or all previous examples wherein the stoplight is projected onto the commodity cart.

Example 9 is a commodity cart of any or all previous examples wherein indication is an audible indication.

Example 10 is a commodity cart of any or all previous examples wherein the indication is communicated to another device wirelessly.

Example 11 is a commodity cart of any or all previous examples wherein the commodity cart is configured to wirelessly transmit a video signal from a camera proximate the commodity cart to a mobile device.

Example 12 is a commodity cart of any or all previous examples wherein the camera is mounted to the commodity cart.

Example 13 is a commodity cart of any or all previous examples wherein the camera is mounted to a drone proximate the commodity cart.

Example 14 is a commodity cart of any or all previous examples and further including fill vehicle detection logic coupled to the controller and configured to detect a fill vehicle and cause the controller to generate the indication of the desired fill vehicle position.

Example 15 is a commodity cart of any or all previous examples and further including a camera coupled to the fill vehicle detection logic, wherein the fill vehicle detection logic is configured to detect the fill vehicle using a signal from the camera and machine vision processing.

Example 16 is a commodity cart of any or all previous examples and further including fill vehicle identification logic coupled to the controller and configured to detect a type of fill vehicle and cause the controller to generate the indication of the desired fill vehicle position based on the detected type of fill vehicle.

Example 17 is a method of transferring agricultural product between a fill vehicle and a commodity cart. The fill vehicle is detected using the commodity cart. A position of the fill vehicle relative to the commodity cart is detected. The method determines whether the fill vehicle is acceptably positioned relative to the commodity cart. A positional correctional output is selectively provided if the fill vehicle is not acceptably positioned relative to the commodity cart.

Example 18 is a method of transferring agricultural product between a fill vehicle and a commodity cart of any or all previous examples wherein detecting the fill vehicle includes detecting a type of fill vehicle and wherein the positional correctional output is based on the detected position of the fill vehicle and the detected type of fill vehicle.

Example 19 is a method of transferring agricultural product between a fill vehicle and a commodity cart is a commodity cart of any or all previous examples wherein detecting the position of the fill vehicle, determining whether the fill vehicle is acceptably positioned, and providing the positional correctional output are repeated until the fill vehicle is acceptable positioned.

Example 20 is a system for positioning a fill vehicle relative to a commodity cart. The system includes a commodity cart and a mobile device. The commodity cart includes a controller, wireless communication circuitry coupled to the controller, a position detection system coupled to the controller, and at least one camera coupled to the controller. The mobile device has a processor and screen and is disposed within the fill vehicle. The controller of the commodity cart is configured to wirelessly communicate with the mobile to detect the fill vehicle and to detect fill vehicle position using the camera and to wirelessly communicate a fill vehicle position indication to the mobile device based on the detected position.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile commodity storage system comprising:

at least one storage tank configured to store a commodity; and a controller configured to generate an output indicative of a desired position of a fill vehicle relative to a chute portion of a transfer arm, the chute portion being configured to receive the commodity from the fill vehicle, the fill vehicle being movable relative to the chute portion, and the transfer arm including an output through which the commodity is configured to be loaded into the at least one storage tank.

2. The mobile commodity storage system of claim 1, wherein the commodity is an agricultural commodity.

3. The mobile commodity storage system of claim 2, wherein the agricultural commodity is a granular agricultural commodity.

4. The mobile commodity storage system of claim 1, wherein the transfer arm is configured to lift the commodity from the chute portion located proximate a ground surface to the output located proximate an elevated opening of the at least one storage tank.

5. The mobile commodity storage system of claim 4, wherein the transfer arm is carried on a mobile machine that includes the at least one storage tank, and is positionable relative to the fill vehicle.

6. The mobile commodity storage system of claim 1, wherein the output indicative of the desired position of the fill vehicle is a visual output.

7. The mobile commodity storage system of claim 6, wherein the visual output is provided on a display of a computing device.

8. The mobile commodity storage system of claim 6, wherein the visual output is provided on a ground surface.

9. The mobile commodity storage system of claim 6, wherein the visual output is provided on a commodity cart that includes the at least one storage tank and the transfer arm.

10. The mobile commodity storage system of claim 1, wherein the output indicative of the desired position of the fill vehicle is automatically provided as a guide for moving the fill vehicle.

11. The mobile commodity storage system of claim 1, wherein the output indicative of the desired position of the fill vehicle is also indicative of an orientation of the fill vehicle.

12. The mobile commodity storage system of claim 1, wherein the controller includes a processor and memory and is configured to programmatically execute instructions to generate the output.

13. The mobile commodity storage system of claim 1, wherein the at least one storage tank is mounted on a mobile machine that includes the transfer arm and configured to be pulled by an agricultural vehicle.

14. The mobile commodity storage system of claim 1, wherein the at least one storage tank is mounted on a self-powered agricultural vehicle that includes the transfer arm.

15. The mobile commodity storage system of claim 1, comprising a mobile commodity storage machine that includes the at least one storage tank and the transfer arm.

16. A method of transferring agricultural product between a fill vehicle and a commodity cart having at least one storage tank configured to store a commodity and having a transfer arm, the transfer arm having a chute portion configured to receive the commodity from the fill vehicle and an output through which the commodity is configured to be loaded into the at least one storage tank, the fill vehicle being movable relative to the chute portion, the method comprising:

detecting, using with the commodity cart, the fill vehicle within a selected proximity relative to the commodity cart;

causing an unmanned aerial vehicle to launch based on detection of the fill vehicle within the selected proximity of the commodity cart; and causing the unmanned aerial vehicle to generate an output indicating a desired fill vehicle position on the ground.

17. The method of claim 16, wherein the output is provided to an operator of the fill vehicle.

18. The method of claim 16, wherein the output is projected onto the ground.

19. A controller that is part of a mobile commodity storage system comprising at least one storage tank configured to store a commodity, wherein the controller is configured to determine a desired position of a fill vehicle relative to a chute portion of a transfer arm for loading the commodity from the fill vehicle to the chute portion, the transfer arm including an output through which the commodity is configured to be loaded into the at least one storage tank, the chute portion being configured to receive the commodity from the fill vehicle, the fill vehicle being movable relative to the chute portion, and wherein the controller is further configured to cause generation of a visual indication of the desired position to facilitate alignment of the fill vehicle for transfer of the commodity to the chute portion.

20. The controller of claim 19, wherein the desired position of the fill vehicle relative to the chute portion of the transfer arm is further determined by the controller to be a desired position of the fill vehicle relative to the chute portion when the chute portion is located proximate to a ground surface.

* * * * *